United States Patent [19]

Laramay et al.

[11] Patent Number: 5,320,173
[45] Date of Patent: Jun. 14, 1994

[54] METHOD OF PREVENTING GAS CONING AND FINGERING IN A HYDROCARBON BEARING FORMATION

[75] Inventors: Mary A. H. Laramay; Jimmie D. Weaver, both of Duncan, Okla.

[73] Assignee: Halliburton Company, Duncan, Okla.

[21] Appl. No.: 958,933

[22] Filed: Oct. 9, 1992

[51] Int. Cl.⁵ ............................................. E21B 33/138
[52] U.S. Cl. ...................................................... 166/295
[58] Field of Search ............... 166/273, 292, 294, 295, 166/308

[56] References Cited

U.S. PATENT DOCUMENTS

| | | |
|---|---|---|
| 2,713,906 | 7/1955 | Allen . |
| 3,616,858 | 11/1971 | Raza . |
| 3,655,349 | 4/1972 | Shah et al. ........................ 29/196.4 |
| 3,687,200 | 8/1972 | Routson ........................... 166/295 X |
| 3,695,356 | 10/1972 | Argabright et al. . |
| 3,749,172 | 7/1973 | Hessert et al. ................... 166/295 X |
| 3,779,315 | 12/1973 | Boneau . |
| 3,785,437 | 1/1974 | Clampitz et al. ................ 166/294 X |
| 3,866,682 | 2/1975 | Jones et al. ..................... 166/292 X |
| 3,909,423 | 9/1975 | Hessert et al. .................. 166/275 X |
| 4,101,425 | 7/1978 | Young et al. .................... 166/308 X |
| 4,113,014 | 9/1978 | Kubens et al. . |
| 4,137,182 | 1/1979 | Golinkin ......................... 166/295 X |
| 4,332,297 | 6/1982 | Sandiford . |
| 4,413,680 | 11/1983 | Sandiford et al. . |
| 4,444,265 | 4/1984 | Schmidt . |
| 4,532,052 | 7/1985 | Weaver et al. .................. 166/307 X |
| 4,534,412 | 8/1985 | Dovan et al. . |
| 4,599,886 | 7/1986 | Brown ................................ 72/349 |
| 4,600,057 | 7/1986 | Borchardt ........................... 166/295 |
| 4,679,625 | 7/1987 | Gibbons ......................... 166/273 X |
| 4,694,906 | 9/1987 | Hutchins et al. . |
| 4,818,350 | 4/1989 | Batzar ................................. 204/29 |
| 4,844,321 | 7/1989 | Matsuzawa et al. ................ 228/107 |
| 4,856,588 | 8/1989 | Borchardt . |
| 5,038,864 | 8/1991 | Dunleavy et al. ................. 166/300 |

Primary Examiner—William P. Neuder
Attorney, Agent, or Firm—Arnold, White & Durkee

[57] ABSTRACT

A method of preventing gas coning or fingering from a gas cap in an oil producing well is provided. A polymerizable material is injected into the gas cap under conditions such that it polymerizes to form a substantially impermeable zone or layer above the oil bearing formation to prevent gas from flowing into the oil well during production.

6 Claims, No Drawings

METHOD OF PREVENTING GAS CONING AND FINGERING IN A HYDROCARBON BEARING FORMATION

BACKGROUND

The present invention relates to methods of preventing gas coning and gas fingering in hydrocarbon bearing formations. More particularly, the present invention relates to methods of preventing gas coning or fingering using high temperature sealants.

Many hydrocarbon bearing formations contain gas as well as oil. Because of its lower density, the gas accumulates at the top of a reservoir and forms what is often called a gas cap.

Usually it is desirable to preferentially produce oil from a formation containing both gas and oil. This is accomplished by cementing the casing through the formation and perforating it only opposite the oil zone. However, there is often a considerable amount of vertical permeability whereby gas is drawn down into the oil bearing portion of the formation as the pressure is reduced when oil flows into the production tubing. When this occurs around the well bore to create an inverted cone shaped volume, it is generally referred to a gas coning. Gas can also preferentially flow through areas of higher permeability such as fractures. When gas flows through these areas into the oil bearing portion of the formation, it is often referred to as fingering.

A number of methods have been developed in an attempt to reduce or solve the problem of gas coning. One such method is disclosed in U.S. Pat. No. 2,713,906. The method disclosed in this patent attempts to selectively block the formation approximately at the plane of the interface between the normal upper surface of the liquid oil and the overlaying gas cap. This blocking or plugging is achieved by localized, selective deposition of an asphaltic or bituminous material at the liquid-gas interface. This is accomplished by injecting asphaltic material into the formation just below the liquid surface as an asphalt-rich solution in an organic solvent or diluent compatible with the reservoir oil and from which the asphaltic substance is precipitated by contact with the reservoir gas. A sufficient amount of the solvent-asphalt solution is injected to displace the reservoir oil a substantial distance in a radial direction from the well bore at the oil-gas interface. The solvent-asphalt solution thereby makes contact with the reservoir gas at the interface and the asphalt is deposited from the solution.

Another method which has been proposed to prevent or reduce gas coning involves the injection of foams into the hydrocarbon bearing formation. Such a process is disclosed in U.S. Pat. No. 3,616,858. According to this process, an MQ-type silicone is pumped into the hydrocarbon bearing formation. The silicone is a foaming agent which can simply be pumped down the well into the entire oil producing formation or it can be pumped into a disk-shaped volume at the oil-gas interface by isolating a portion of the well with packers. As gas tries to flow through the silicone, the gas causes the silicone to foam, thus inhibiting further flow.

Still a further method of preventing gas coning is disclosed in U.S. Pat. No. 3,779,315. This method involves the injection of a polymeric solution into the hydrocarbon containing formation at a location lower in elevation than the gas cap. Preferably, gas is removed from the gas cap during injection to facilitate movement of the polymeric material up into the zones of high permeability between the gas cap and the lower oil bearing portion of the formation. Preferred polymers include partially hydrolyzed polyacrylamides, polysaccharide carboxylmethyl cellulose and polyethylene oxide. Water is at least intermittently injected into the gas cap above the deposited polymer layer as oil is subsequently produced from the bottom of the formation.

While these methods have experienced some success they each have their limitations and disadvantages. Accordingly, it would be an advancement in the art to provide a method for preventing gas coning and fingering in which the substance being injected had a substantial depth of penetration to provide a large area of low permeability. It would be a further advancement to provide a system that was thermally stable at higher temperatures. Such methods are disclosed and claimed herein.

SUMMARY OF THE INVENTION

The present invention provides a method of preventing gas coning and fingering in hydrocarbon bearing formations containing both oil and gas. In a preferred embodiment, a polymerizable material is injected through a well bore into a gas zone above an oil bearing zone under conditions such that the polymerizable material will polymerize above the oil bearing zone to form an impermeable zone or layer. Oil can then be produced from the oil bearing zone below this layer without gas coning or fingering.

In a preferred embodiment, the polymerizable material comprises a gas or mixture of gases which can easily be injected into the gas zone. In one preferred embodiment, these gases include ethylene oxide, propylene oxide, 1,3-butadiene or mixtures thereof. Polymerization of these materials can be initiated thermally if 1,3-butadiene is present or with gaseous Lewis acids such as carbon dioxide ($CO_2$), boron trifluoride ($BF_3$), or hydrogen chloride (HCl) which can be injected concurrently with the polymerizable material.

In another preferred embodiment, the polymerizable material comprises a liquid or gas, depending upon the temperature and pressure of the reservoir. For example, styrene/1,3-butadiene mixtures, isoprene/1,3-butadiene mixtures, and methyl methacrylate/isoprene mixtures.

In another preferred embodiment, compounds which are thermally degradable over time to give compounds susceptible to thermal polymerization can be injected into the gas zone and polymerized after a given period of time. For example, trioxane, $(CH_2O)_3$, and phenol can be injected into the formation. Upon decomposition of the formaldehyde trimer, the phenol and formaldehyde polymerize.

In still further embodiments of the invention, monomers, oligomers or mixtures thereof in aqueous or nonaqueous solutions can be injected into the gas zone and polymerized after a given period of time.

DETAILED DESCRIPTION OF THE PREFERRED EMBODIMENTS

The present invention provides methods for treating hydrocarbon bearing formations in order to decrease or eliminate gas coning and fingering that occur during production of oil through a well bore. The present invention involves the injection of a polymerizable gas or solution into the gas cap above the oil bearing zone adjacent the well bore. The gas or solution is polymerized in the formation around the well bore to form an essentially impermeable layer or zone. This zone prevents the free flow of gas into the oil bearing zone adjacent the well bore as the oil is removed during production.

As used herein, an impermeable zone or layer does not mean an area through which no gas can flow. Rather, it refers to an area in which the gas permeability has been reduced significantly as compared to the horizontal permeability of the formation with respect to oil so as to reduce or eliminate gas coning and fingering when the oil is produced.

In a preferred embodiment, the polymerizable material is a gas at the temperature and pressure conditions of the hydrocarbon bearing formation. The use of a polymerizable gas is advantageous in that it can penetrate further into the gas zone to form a larger impermeable layer.

Various types of polymerizable gases can be used in the present invention. For example, ethylene oxide, propylene oxide, 1,3-butadiene and mixtures thereof can be used. Polymerization of these materials can be cation initiated with various gaseous sources including Lewis acids such as carbon dioxide, boron trifluoride and hydrogen chloride. Additionally, 1,3-butadiene can be self polymerized or can initiate copolymerizations at temperatures above about 125° C.

The polymerization rate in the gas zone can be controlled by varying one or more parameters of the gaseous mixture. For example, the strength and/or concentration of the Lewis acid will affect the rate of polymerization. Additionally, the monomer system may be diluted with an inert gas such as nitrogen to lower its concentration and therefore the reaction rate. Additionally, the monomer selected or the ratio of monomers can be changed to modify the reaction rate since propylene oxide has a lower reactivity than ethylene oxide.

Polymerization reactions of monomers are well known to those of skill in the art of polymers. Accordingly, suitable gas mixtures that will polymerize within a suitable time period for the temperature and pressure conditions of a specific hydrocarbon formation can readily be determined.

In additional embodiments, the polymerizable material may be a gas or liquid, depending upon the temperature and pressure of the formation. For example, styrene/1,3-butadiene mixtures can be used. The butadiene is a gas at ambient temperatures and the styrene has a boiling point of 140° C. These compounds polymerize to provide thermally stable copolymers.

In another embodiment, 1,3-butadiene is polymerized with isoprene which has a boiling point of 34° C. Isoprene can also be polymerized with methyl methacrylate which has a boiling point of 100° C. Methyl methacrylate can also undergo self polymerization.

In another preferred embodiment, the polymerizable material includes at least one compound which must degrade before it can polymerize. This provides a built in delay for the polymerization reaction. In one preferred embodiment, the polymerizable composition comprises a mixture of trioxane, $(CH_2O)_3$, and phenol. The formaldehyde trimer cracks to give formaldehyde which then reacts with the phenol to give a thermally stable polymer.

In still a further embodiment of the present invention, a monomer or oligomer, or a mixture of monomers and/or oligomers in aqueous or nonaqueous solutions can be injected into the gas zone and polymerized over a given period of time. Specific examples of these systems include low molecular weight urea/formaldehyde resins in aqueous solutions which will further polymerize at high temperatures and certain pH conditions, pyromellitic dianhydride/p-phenylenediamine monomer systems in aqueous solutions which polymerize at high temperatures to give crosslinked thermally stable polymers, and N,N'-methylenebisacrylamide dissolved in water which will polymerize with well known free radical initiator systems.

Again, the rate of polymerization can be controlled by modifying various parameters such as the pH of the system or concentration of the reactants. Additionally, the selection of initiators and retarders for the polymer systems can be used to control the rate of polymerization.

In practicing the present invention, the polymerizable material is injected using standard injection techniques into the gas zone in the hydrocarbon bearing formation. Preferably, sufficient material is injected such that it penetrates to a radial distance of about 50 feet. The amount of material which must be injected will be dependent upon the height of the gas cap and the porosity of the formation. After injection of the polymerizable materials, the well is shut-in for a sufficiently long period of time to allow the materials to polymerize. This can be anywhere from a few hours to several days.

While the methods of the present invention are especially adapted for use in high temperature formations since they form thermally stable polymers, it will be appreciated by those skilled in the art that the methods can be adapted and used in essentially any type of hydrocarbon formation.

further, while the invention has been described with respect to the presently preferred embodiments, it will be appreciated by those skilled in the art that numerous changes or modifications could be made without departing from the spirit and scope of the invention. For example, many other types of polymerizable compounds in addition to the ones listed above could be used. Accordingly, the invention is to be construed in accordance with the appended claims rather than by the foregoing description.

What is claimed is:

1. A method of preventing gas coning and fingering in a hydrocarbon bearing formation comprising:
    injecting a gaseous polymerizable material selected from the group consisting of ethylene oxide, propylene oxide, 1,3-butadiene and mixtures thereof, through a well bore into a gas zone above an oil bearing zone under conditions such that the polymerizable material will polymerize above the oil bearing zone to form an essentially impermeable zone or layer;
    shutting in said well for a sufficient time to permit said material to polymerize; and
    producing oil from said oil bearing zone through said well bore.

2. A method of preventing gas coning and fingering as defined in claim 1 further comprising an initiator.

3. A method of preventing gas coning and fingering as defined in claim 2 wherein said initiator comprises a gaseous Lewis acid.

4. A method of preventing gas coning and fingering in a hydrocarbon bearing formation comprising:
    injecting a polymerizable material comprising a mixture of trioxane and phenol through a well bore into a gas zone above an oil bearing zone under conditions such that the polymerizable material will polymerize above the oil bearing zone to form an essentially impermeable zone or layer;

shutting in said well for a sufficient time to permit said material to polymerize; and producing oil from said oil bearing zone through said well bore.

5. A method of preventing gas coning and fingering in a hydrocarbon bearing formation comprising:

injecting a polymerizable material comprising an aqueous solution of pyromellitic dianhydride and p-phenylenediamine through a well bore into a gas zone above an oil bearing zone under conditions such that the polymerizable material will polymerize above the oil bearing zone to form an essentially impermeable zone or layer;

shutting in said well for a sufficient time to permit said material to polymerize; and producing oil from said oil bearing zone through said well bore.

6. A method of preventing gas coning and fingering in a hydrocarbon bearing formation comprising:

injecting a polymerizable material comprising an aqueous solution of a low molecular weight urea/formaldehyde resin through a well bore into a gas zone above an oil bearing zone under conditions such that the polymerizable material will polymerize above the oil bearing zone to form an essentially impermeable zone or layer;

shutting in said well for a sufficient time to permit said material to polymerize; and producing oil from said oil bearing zone through said well bore.

* * * * *